US008295490B1

(12) United States Patent  (10) Patent No.: US 8,295,490 B1
McCoy et al.  (45) Date of Patent: Oct. 23, 2012

(54) METHOD AND SYSTEM FOR STORING AND PROVIDING AN ENCRYPTION KEY FOR DATA STORAGE

(75) Inventors: Travis McCoy, Fraser, CO (US); Timothy R. Steele, Seattle, WA (US); Nicolas Zea, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/347,637

(22) Filed: Jan. 10, 2012

Related U.S. Application Data

(60) Provisional application No. 61/570,246, filed on Dec. 13, 2011.

(51) Int. Cl.
*H04L 9/08* (2006.01)
*G06F 7/04* (2006.01)
(52) U.S. Cl. ............................................. 380/279; 726/4
(58) Field of Classification Search .................. 380/279; 726/4
See application file for complete search history.

(56) References Cited

U.S. PATENT DOCUMENTS

| | | | |
|---|---|---|---|
| 5,495,533 A * | 2/1996 | Linehan et al. ............... 713/155 |
| 7,930,757 B2 * | 4/2011 | Shapiro et al. .................. 726/27 |
| 2004/0161110 A1 * | 8/2004 | Kanai et al. .................... 380/279 |
| 2006/0085862 A1 * | 4/2006 | Witt et al. ....................... 726/26 |
| 2007/0162766 A1 | 7/2007 | Watanabe |
| 2009/0034733 A1 | 2/2009 | Raman et al. |
| 2009/0208017 A1 * | 8/2009 | Almoustafa et al. .......... 380/277 |
| 2009/0292918 A1 | 11/2009 | Mori et al. |
| 2010/0100724 A1 * | 4/2010 | Kaliski, Jr. .................... 713/155 |
| 2010/0299521 A1 | 11/2010 | Koike |
| 2011/0145589 A1 * | 6/2011 | Camenisch et al. .......... 713/185 |

* cited by examiner

*Primary Examiner* — Techane Gergiso
(74) *Attorney, Agent, or Firm* — McDermott Will & Emery LLP

(57) ABSTRACT

Systems, methods, and machine-readable media for providing an encryption key to a user are provided. The system may include a key storage module, an interface module, and an authentication module. The key storage module may be configured to store an encryption key for a user on an encryption key server, wherein the encryption key is used with user data on a data storage server. The interface module may be configured to receive a request for the encryption key from a client machine associated with the user. The authentication module may be configured to authenticate the user, wherein the interface module may further be configured to transmit the encryption key to the client machine in response to authenticating the user.

15 Claims, 6 Drawing Sheets

METHOD AND SYSTEM FOR STORING AND PROVIDING AN ENCRYPTION KEY FOR DATA STORAGE

RELATED APPLICATION

This application claims priority to U.S. Provisional Patent Application No. 61/570,246, filed on Dec. 13, 2011, entitled "METHOD AND SYSTEM FOR STORING AND PROVIDING AN ENCRYPTION KEY FOR DATA STORAGE," the entire contents of which are herein incorporated by reference in its entirety.

BACKGROUND

The present disclosure generally relates to information processing and, in particular, storing user data on servers.

Many service providers (e.g., cloud computing services, data sync services, file hosting services, etc.) enable user data to be stored at one or more servers. For example, an application synchronization service may allow a user to sync one or more applications so that user data associated with one application on one client system may be transferred and used on another application on another client system. Synchronization of the applications on the two systems may be achieved by storing user data on a data storage server.

In order to protect user data and the privacy of users, software on a first client system may generate an encryption key based on a passphrase (e.g., the user's password or another user supplied string) and encrypt the user data using the encryption key before it is transmitted to a data storage server to be stored. The user may download the encrypted data from the data storage server on a second client system. However, in order to access the encrypted data on the second client system, the second client system must have access to a key to decrypt the encrypted data. In some cases, the second client system may generate a key using the same user provided passphrase or password and decrypt the encrypted data using the key. However, the user may not be able to generate the key to decrypt the encrypted user data if the user forgets the passphrase (or if the user changes his password).

SUMMARY

According to one aspect of the subject technology, a system for providing an encryption key to a user is provided. The system may include a key storage module, an interface module, and an authentication module. The key storage module may be configured to store an encryption key for a user on an encryption key server, wherein the encryption key is used with user data on a data storage server. The interface module may be configured to receive a request for the encryption key from a client machine associated with the user. The authentication module may be configured to authenticate the user, wherein the interface module may further be configured to transmit the encryption key to the client machine in response to authenticating the user.

According to another aspect of the subject technology, a method for providing an encryption key to a user is provided. The method may include storing an encryption key for a user on an encryption key server, wherein the encryption key is used with user data stored on a data storage server which is different than the encryption key server, receiving a request for the encryption key from a client machine associated with the user, and authenticating the user. The method may further include transmitting the encryption key to the client machine in response to authenticating the user.

According to yet another aspect of the subject technology, a machine-readable medium including instructions stored therein, which when executed by a machine, cause the machine to perform operations for providing an encryption key to a user. The operations may include receiving, from a client machine associated with a user, a request for an encryption key for the user, wherein the encryption key is associated with storing user data on a data storage server, determining whether the encryption key is stored on an encryption key server, and transmitting the encryption key to the client machine if the encryption key is stored on the encryption key server.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

Figure 1:
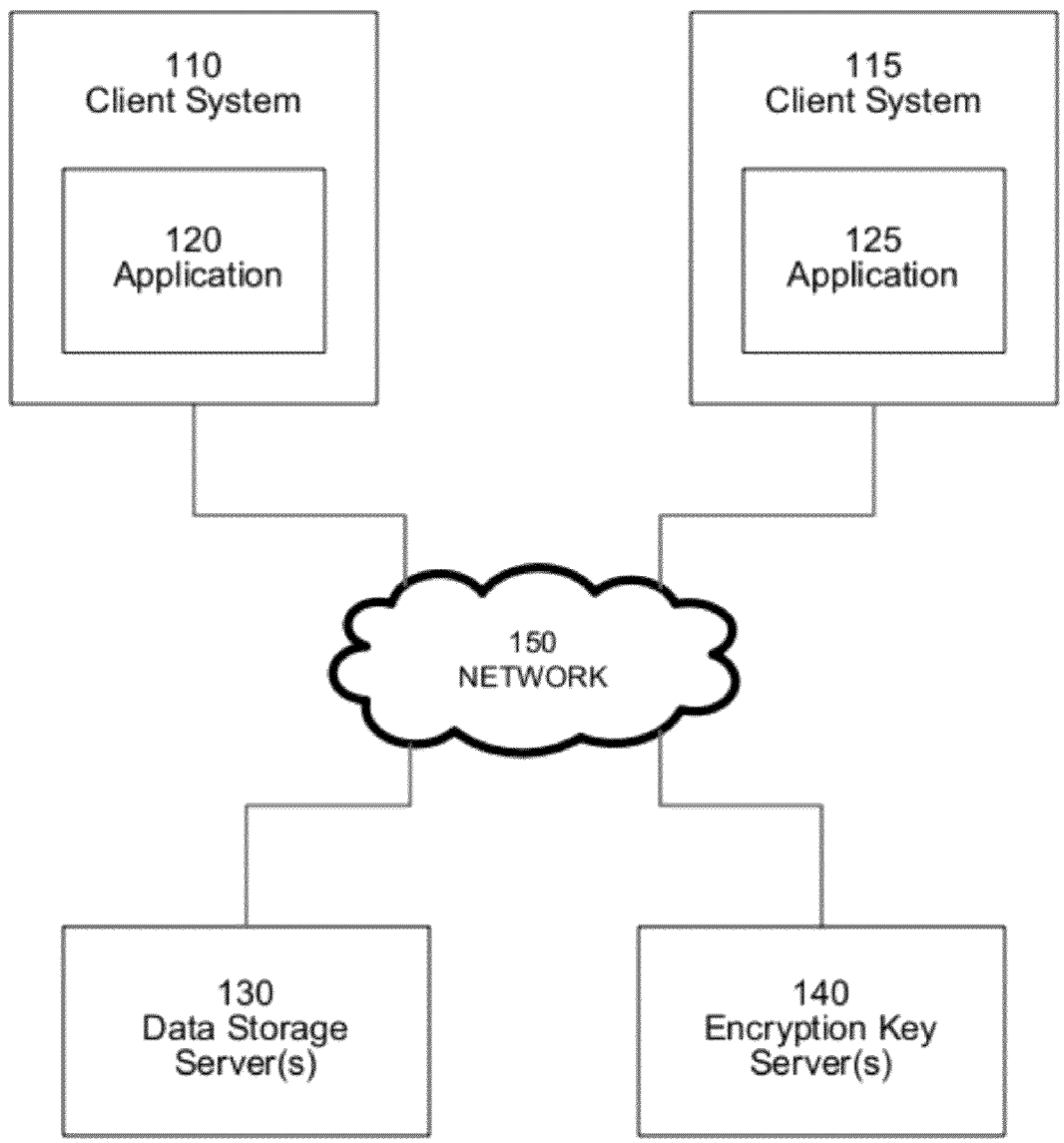
FIG. 1 is a conceptual block diagram illustrating an environment 100 for providing, to a user, an encryption key stored on a separate server from the data storage server, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

According to various aspects of the subject technology, systems and methods for storing an encryption key on a separate server from the data storage server and providing the encryption key to a user are provided. The system may be configured to generate an encryption key for a user, store the encryption key on an encryption key server, and provide the encryption key to the user on a client machine in order to enable the user to encrypt data to be stored on a data storage server or decrypt data received from the data storage server.

According to one aspect of the subject technology, a user may request an encryption key from an encryption key server. Before responding to the request, the encryption key server may first authenticate the user based on one or more authentication credentials (e.g., user name and password, ocular scan, security question, etc.). Once the user is authenticated, the encryption key server may determine if the user is already associated with an encryption key. If the user is not associated with an encryption key (e.g., if this is the first time the user is requesting an encryption key), the encryption key server may create an encryption key for the user. The encryption key may be generated based on a user defined encryption passphrase, a user characteristic (e.g., a user password), or randomly using on any number of encryption key generation methods. After the encryption key is generated, the encryption key server may store a copy of the encryption key in a record associated with the user and transmit a copy of the encryption key to the user on the client machine. If the authenticated user already has an encryption key stored on the encryption key server, the encryption key server may transmit the encryption key to the user.

Once the client machine receives the encryption key, the client machine may encrypt data the user wishes to store on the data storage server using the encryption key and transmit the encrypted data to the data storage server to be stored. If, on the other hand, the user wishes to access data stored on the data storage server, the user may download the data from the data storage server to a client machine and use the encryption key to decrypt the data stored on the storage server.

By storing an encryption key on an encryption key server, the system is able to provide a convenient way for a user, on a client machine, to encrypt data to be stored on a storage server and decrypt data received from the storage server. The ability of the user to encrypt and decrypt data on the client machine provides additional security and privacy because all data stored by the storage server is encrypted. Furthermore, because the encryption key is stored on the server, an authenticated user may have access to the encryption key without needing to remember an encryption key passphrase needed to generate the correct encryption key. The encryption key may also be changed remotely or transparently to the user and the client systems so that if the encryption key is compromised, it may be changed on the encryption key server and authenticated users would be able to automatically use the new encryption key to encrypting or decrypting data.

In some aspects, because the encryption and decryption functions are separate from the authentication mechanism, the user may have access to the user's encryption keys stored on the encryption key server no matter which authentication mechanism the user may use. For example, the user may be authenticated using a user name and password, a public key certificate (e.g., a secure sockets layer (SSL) certificate), an ocular scan, a third-party authentication provider (e.g., OpenID), or another authentication mechanism and have access to the encryption keys stored on the encryption key server that are associated.

FIG. 1 is a conceptual block diagram illustrating an environment 100 for providing, to a user, an encryption key stored on a separate server from the data storage server, in accordance with various aspects of the subject technology. Although FIG. 1 illustrates a client-server network environment 100, other aspects of the subject technology may include other configurations including, for example, peer-to-peer environments. The network environment includes one or more client systems 110 and 115 that are connected to and one or more data storage servers 130 and one or more encryption key servers 140 via a network 150 (e.g., the Internet).

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The client systems 110 and 115 may be any machines capable of communicating with the servers 130 and 140 via the network 150. For example, client system 110 or 115 may be a desktop computer, a laptop, a mobile device (e.g., a smart phone, tablet, personal digital assistant (PDA), a global positioning system (GPS) device, etc.), or any other machine with a processor, memory, and communications capabilities.

Each client system may also include one or more applications 120 and 125 that may be configured to store user data on a data storage server 130. The applications 120 and 125 may be applications that are used in conjunction with a variety of services such as cloud computing services, data syncing services, file hosting services, etc. In some aspects, the application 120 on one client system 110 may be configured to upload user data to a data storage server 130 so that the user data may be accessible to another application 125 on another client system 115. In order to provide an added layer of protection for the user, the user data may be encrypted before uploading the user data to the data storage server 130.

In one aspect, one application 120, such as a web browser, may be configured to store a user's data that may include bookmarks, user preferences, personal information, saved passwords, and other information associated with the user on the data storage server 130. The user's private or sensitive data may first be encrypted on the client system 110 before being uploaded to a data storage server 130. After the user data is uploaded to the data storage server 130, the user may access the stored user data on other client systems 115 having an application 125 configured to download data storage server 130 and decrypt the user data.

The encryption key server 140 may be any system or device having a processor, a memory, and communications capability able to communicate with a client system 110 or 115 and store an encryption key. According to some aspects, the encryption key server 140 may also be configured to generate encryption keys to be used to encrypt and decrypt user data.

Figure 2:
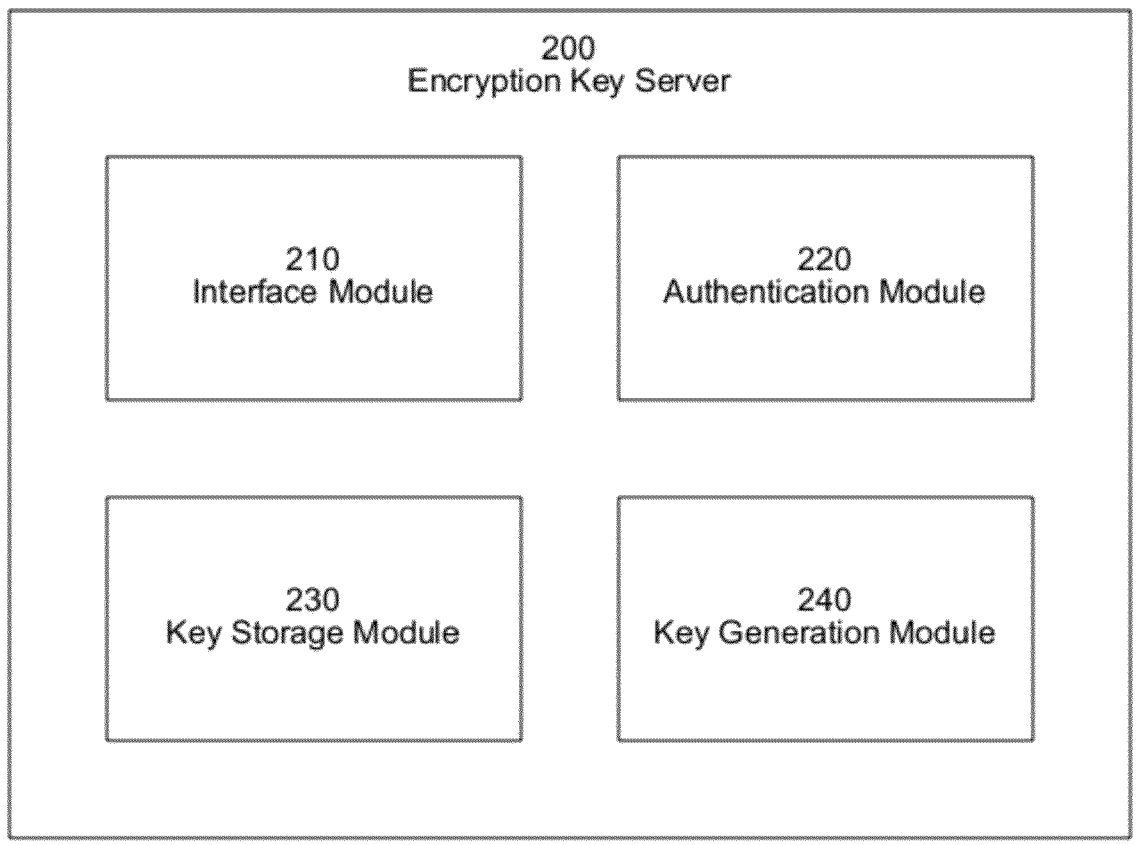
FIG. 2 is a conceptual block diagram illustrating a system (e.g., an encryption key server) configured to provide an encryption key to a client system, in accordance with various aspects of the subject technology.

FIG. 2 is a conceptual block diagram illustrating a system (e.g., an encryption key server 200) configured to provide an encryption key to a client system, in accordance with various aspects of the subject technology. The system 200 may include an interface module 210, an authentication module 220, a key storage module 230, and a key generation module 240. The interface module 210 may be configured to communicate with one or more client systems or servers. For example, the interface module may receive a request to authenticate a user or a request for an encryption key from a client system.

The authentication module 220 may be configured to authenticate a user. The user may be authenticated using various methods. For example, a user may be authenticated based on authentication credentials such as, for example, a user identifier (e.g., a user name) and password, security questions, user biometrics (e.g., a fingerprint scan, a facial recognition scan, an ocular scan, a voice scan, etc.), or a security token. In some aspects, a user may be authenticated using a third-party authentication service such as OpenID.

After a user of a client system is authenticated and in response to the interface module 210 receiving a request for an encryption key from the user, the key storage module 230 may be configured to determine whether an appropriate encryption key for the user is accessible to the encryption key server 200. If an appropriate encryption key is available or stored by the key storage module 230, the interface module 210 may transmit the encryption key to the client system that the user is authenticated on.

If an appropriate encryption key is not found by the key storage module 230, the key generation module 240 may be configured to generate an encryption key for the user. In one aspect, the encryption key may be generated using symmetric-key algorithms or asymmetric key algorithms (e.g., public key/private key algorithms). For example, a piece of user information such as the user's password or a user provided passphrase may be inputted into a cryptographic hash function in order to generate an encryption key. In other aspects, however, the encryption key may be generated independently of any user information.

In some aspects, one encryption key may be generated that is configured to encrypt the user's data to be stored on a data storage server and decrypt the user's data retrieved from the data storage server. In another aspect, multiple encryption keys may be generated for a user. For example, the key generation module 240 may generate one key configured to encrypt data to be stored on a data storage server and another key configured to decrypt data retrieved from the data storage server. Multiple encryption keys may also be generated and assigned to different components of the user's data. For example, where the user data includes bookmarks, user preferences, personal information, and saved passwords, bookmarks and user preferences may be encrypted and decrypted with one set of encryption keys while personal information and passwords may be encrypted and decrypted with another set of encryption keys.

Figure 3:
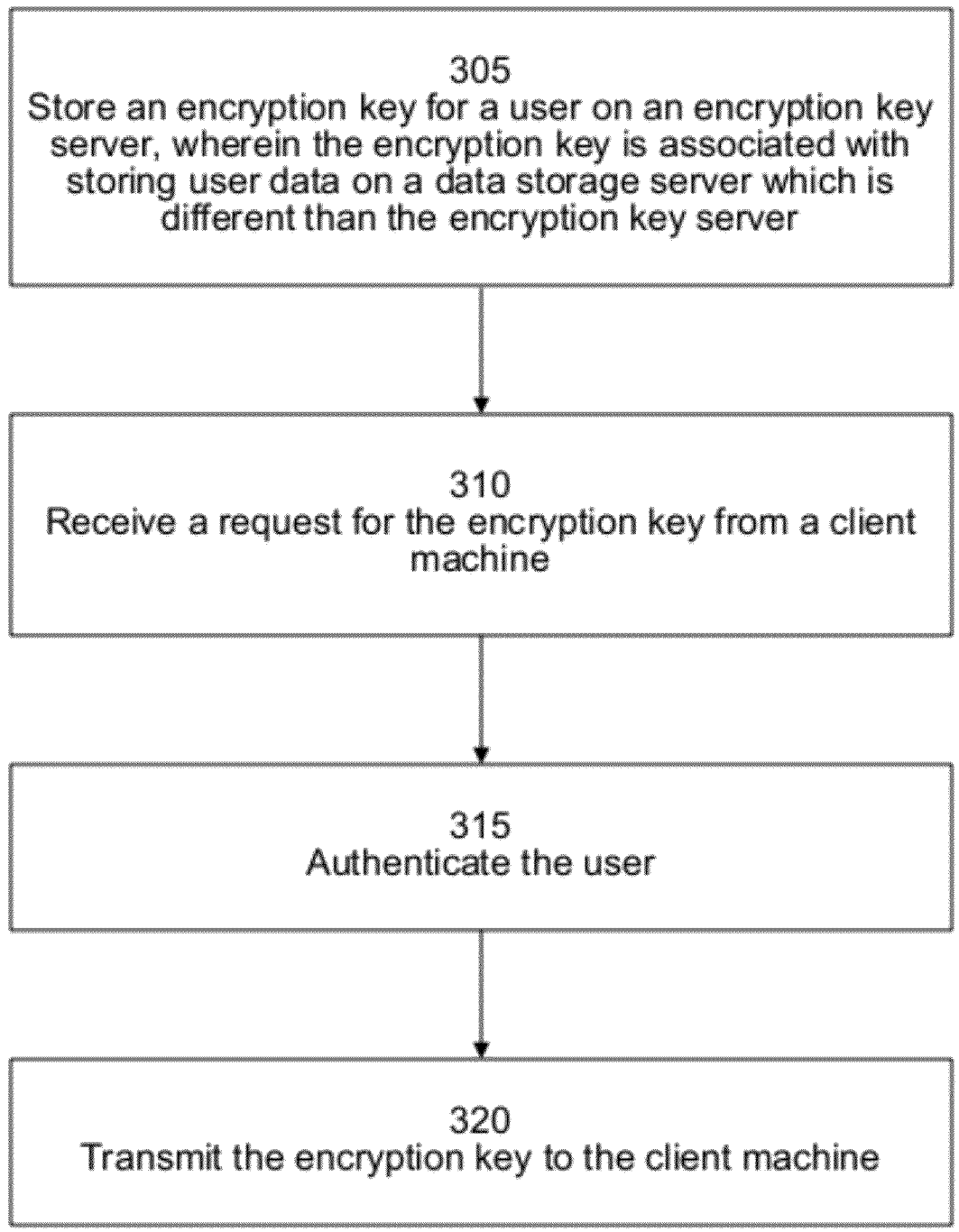
FIG. 3 is a flow chart illustrating a process for providing an encryption key to a client machine, in accordance with various aspects of the subject technology.

FIG. 3 is a flow chart illustrating a process 300 for providing an encryption key to a client machine, in accordance with various aspects of the subject technology. Although the operations in process 300 are shown in a particular order, certain operations may be performed in different orders or at the same time. The process 300 may begin at operation 305, where the key storage module 230 stores an encryption key for a user on an encryption key server 140 wherein the encryption key is configured to be used in the storage or retrieval of user data on a data storage server 130.

At some point (e.g., at operation 310), the interface module 210 may receive, from a user on a client machine 110, a request for the encryption key. The client machine 110 may request the encryption key so that the client machine 110 may encrypt data that is to be stored on a data storage server 130 or so that the client machine 110 may decrypt data that has been retrieved from the data storage server 130.

If the user has not already been authenticated, the authentication module 220 may authenticate the user at operation 315 in order to determine that the user is authorized to access the requested encryption key. If the user is authenticated, the interface module 210 may transmit the requested encryption key to the client machine 110 at operation 320 so that the client machine may encrypt user data to be stored on the data storage server 130 or decrypt user data retrieved from the data storage server 130. Additional aspects of storing and retrieving user data stored on a data storage server 130 using an encryption key stored on an encryption key server 140 are discussed further with respect to the more specific examples illustrated in FIG. 4 and FIG. 5.

Figure 4:
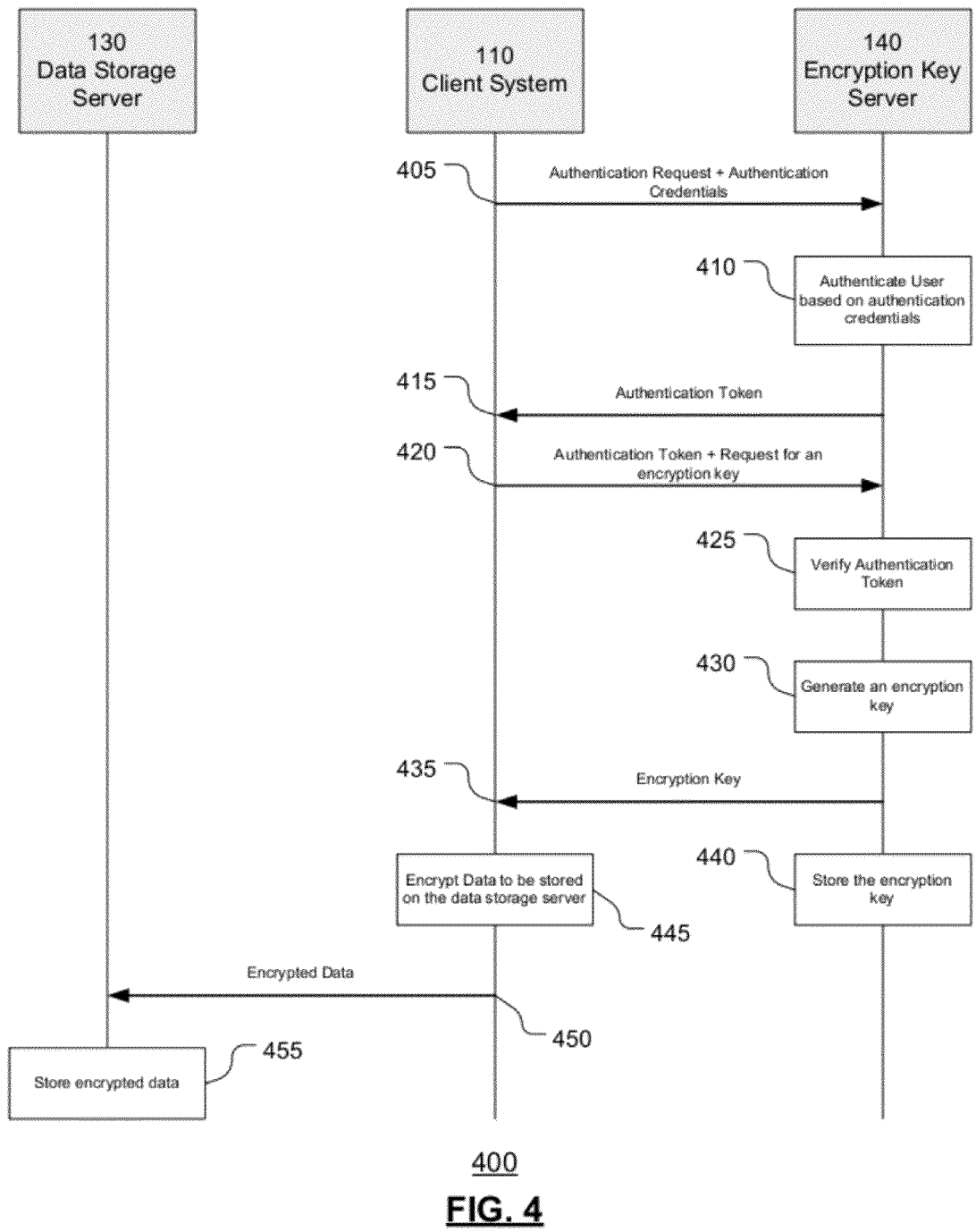
FIG. 4 is a communication diagram illustrating a process for providing an encryption key to a client system, wherein the encryption key is to be used to encrypt user data to be stored on an data storage server, in accordance with various aspects of the subject technology.

FIG. 4 is a communication diagram 400 illustrating a process for providing an encryption key to a client system 110, wherein the encryption key is to be used to encrypt user data to be stored on an data storage server 130, in accordance with various aspects of the subject technology. Although the communication diagram 400 may show certain events occurring in a particular order, other orderings may also be possible.

In some cases, in order to request an encryption key from the encryption key server 140, a client system 110 must first be authenticated by the encryption key server 140. Accordingly, at event 405, an application 120 on the client system 110 may generate an authentication request and transmit the authentication request to the encryption key server 140 along with authentication credentials (e.g., a user name and password, a fingerprint scan, a ocular scan, etc.) associated with the authentication request.

At event 410, the authentication module of the encryption key server 140 attempts to authenticate the user based on the authentication credentials provided by the client system 110. As discussed above, according to some aspects, the authentication module may authenticate the user by contacting a third party authentication provider. If the user is authenticated, the authentication module may transmit an authentication token to the client system 110 at event 415. The authentication token may be used by the client system 110 in communications with the encryption key server 140 so that the encryption key server 140 will recognize the user of the client system 110 as authenticated. If the identity of the user can not be authenticated, the authentication module may withhold the authentication token from the user and notify the client system 110 that the user could not be authenticated.

At event 420, the client system 110 may submit to the encryption key server 140 a request for an encryption key for the user along with the authentication token provided by the encryption key server 140. Once the request is received by the interface module of the encryption key server 140, at event 425 the authentication module may confirm that the user is authorized using the authentication token received along with the request. If the user is authorized, the key storage module may check if an appropriate encryption key for the user is stored by the encryption key server 140.

If an appropriate encryption key is found, the encryption key may be transmitted to the client system 110. If no encryption key is found, as is illustrated in FIG. 4, the key generation module may generate an encryption key for the user at event 430 and the encryption key may be transmitted to the client system 110 at event 435. The generated encryption key may also be stored by the key storage module on the encryption key server 140 (see event 440) for future use by the user. The encryption key may be stored at any time after it is generated (e.g., before, during, or after the encryption key is sent to the client system 110 at event 435).

Once the encryption key is received by the client system 110, at event 445, the application 120 on the client system 110 may encrypt the user data to be stored on the data storage server 130 and, at event 450, transmit the encrypted user data to the data storage server 130. At event 455, the encrypted user data may be stored on the data storage server 130 so that the encrypted user data may be retrieved in the future for use by the user on the same client system 110 or another client system 115.

Figure 5:
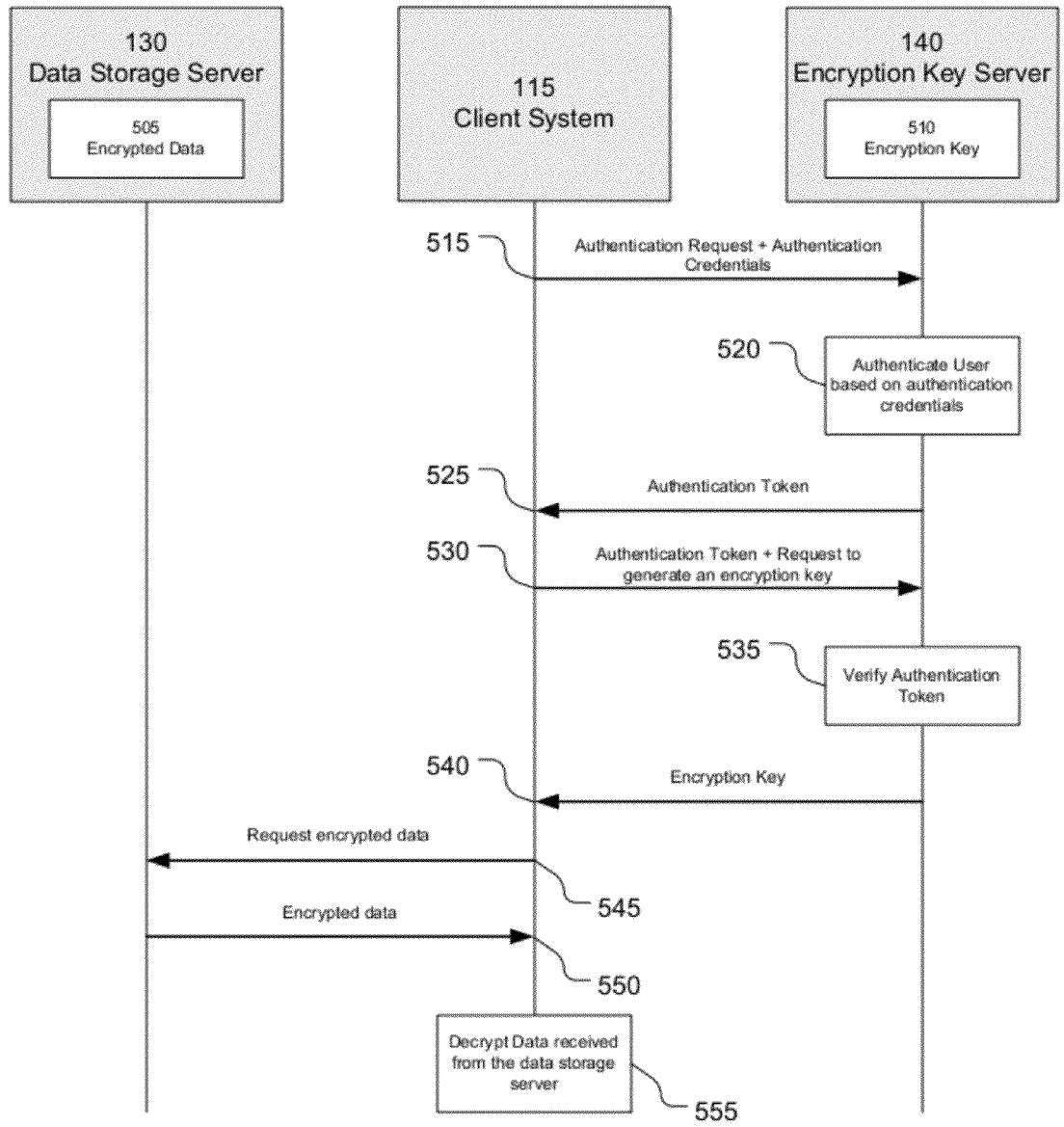
FIG. 5 is a communication diagram illustrating a process for providing an encryption key to a client system, wherein the encryption key is to be used to decrypt user data retrieved from a data storage server 130, in accordance with various aspects of the subject technology.

For example, FIG. 5 is a communication diagram 500 illustrating a process for providing an encryption key to a client system 110, wherein the encryption key is to be used to decrypt user data retrieved from a data storage server 130, in accordance with various aspects of the subject technology. Although the communication diagram 500 may show certain events occurring in a particular order, other orderings may also be possible. In communication diagram 500, the data storage server 130 stores encrypted data 505 and the encryption key server 140 stores a encryption key 510 for the user of a client system 115. In order to access user data stored on the data storage server 130, the client system 115 must retrieve the encrypted user data 505 from the data storage server 130 and the encryption key 510 from the encryption key server 140 and use the encryption key 510 to decrypt the encrypted user data 505.

As discussed above with respect to FIG. 4, a client system 110 may, in some cases, need to be authenticated by the encryption key server 140 to be able to access the encryption key 510 on the encryption key server 140. Accordingly, at event 515, an application 125 on the client system 115 may generate an authentication request and transmit the authentication request to the encryption key server 140 along with authentication credentials associated with the authentication request.

In response to the authentication request, the authentication module of the encryption key server 140 my authenticate the user based on the authentication credentials at event 520 and transmit an authentication token to the client system 115 at event 525. Once the authentication token is received by the client system 115, the client system 115 request the encryption key 510 from encryption key server 140 at event 530.

At event 535, the authentication module of the encryption key server 140 may verify that the user of the client system 115 is authorized to access the encryption key 510 based on the authentication token the client system 115 transmitted along with the request. If the user is authorized, the key storage module of the encryption key server 140 may retrieve the stored encryption key 510 and transmit it to the client system 115 at event 540.

The client system 115 retrieves the encrypted data 505 by requesting and receiving the encrypted data 505 from the data storage server 130 at events 545 and 550. In some aspects, in order to retrieve the encrypted data 505 from the data storage server 130, the data storage server 130 may first require authentication of the user. Although FIG. 5 shows events 545 and 550 occurring after events 515-540, the client system 115 may retrieve the encrypted data 505 from the data storage server 130 at any time (e.g., before, during, or after events 515-540). Once the client system 115 obtains the encrypted data 505 from the data storage server 130 and the encryption key 510 from the encryption key server 140, an application on the client system 115 may decrypt the encrypted data 505 using the encryption key 510 and access the previously encrypted data.

Figure 6:
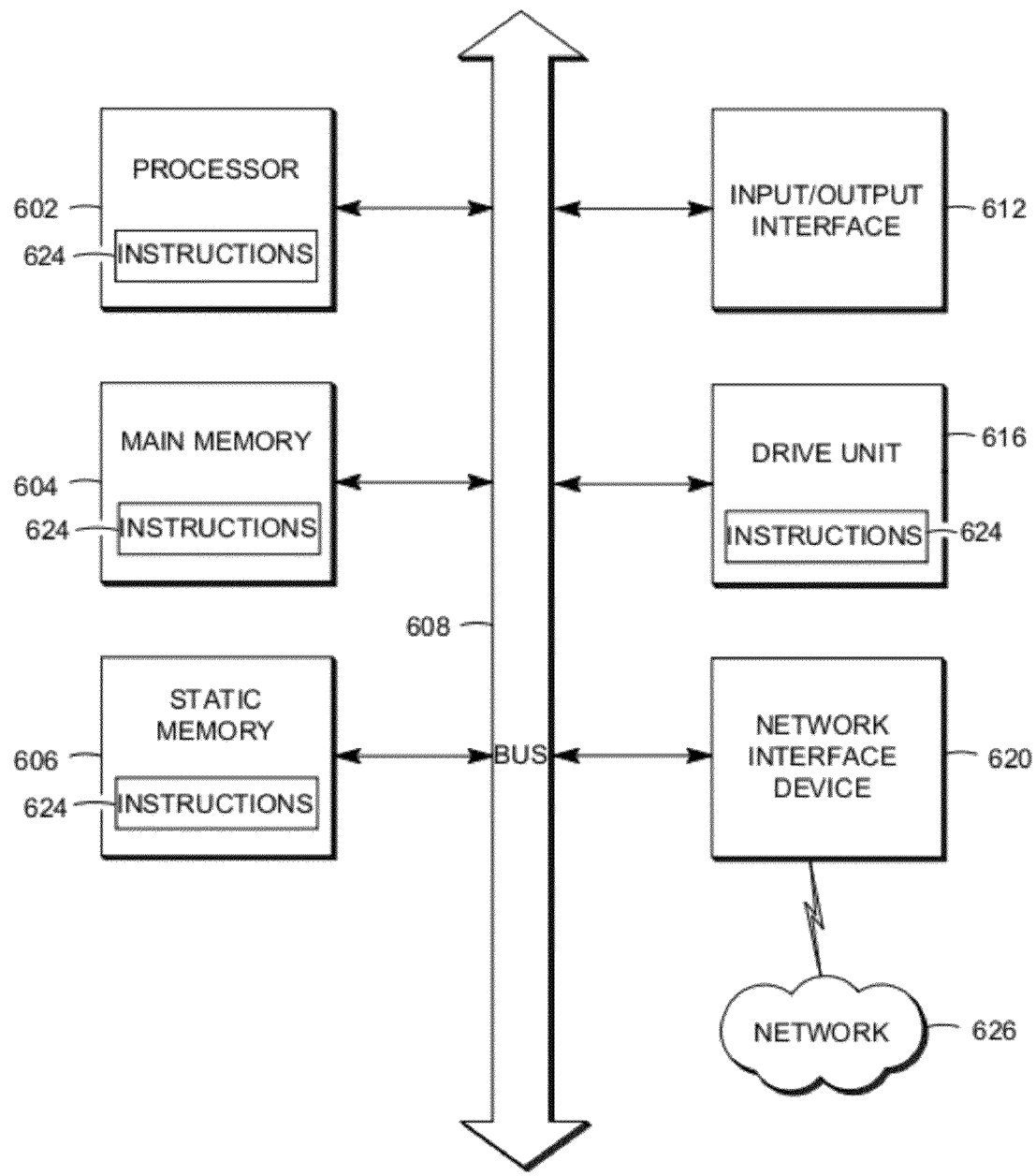
FIG. 6 is a block diagram illustrating a computer system with which any of the clients and servers of FIG. 1 may be implemented, in accordance with various aspects of the subject technology.

FIG. 6 is a block diagram illustrating a computer system with which any of the clients and servers of FIG. 1 may be implemented, in accordance with various aspects of the subject technology. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed database, and/or associated caches and servers) that store the one or more sets of instructions. The machine-readable medium may include the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for providing an encryption key to a user are provided. The system may include a key storage module, an interface module, and an authentication module. The key storage module may be configured to store an encryption key for a user on an encryption key server, wherein the encryption key is associated with storing user data on a data storage server. The interface module may be configured to receive a request for the encryption key from a client machine associated with the user. The authentication module may be configured to authenticate the user, wherein the interface module may further be configured to transmit the encryption key to the client machine in response to authenticating the user.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C.§112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for providing an encryption key to a user, the method comprising:
   receiving, at an encryption key server, from a client machine, a request for an encryption key for a component of user data for a user, wherein the encryption key is one of a plurality of encryption keys for components of user data for the user;
   authenticating the user;
   determining, in response to the authenticating of the user, whether the encryption key for the component of user data is stored on the encryption key server;
   generating, if the encryption key for the component of user data is not stored on the encryption key server, the encryption key for the component of user data, wherein the encryption key is configured to be used with the component of user data and a data storage server which is different than the encryption key server; and
   transmitting the encryption key for the component of user data to the client machine;
   wherein the encryption key server includes an authentication module for authenticating the user, a key generation module for generating the encryption key, a key storage module for storing the encryption key and an interface module for receiving the request for the encryption key from the client machine associated with the user.

2. The method of claim 1, wherein the encryption key is configured to encrypt the component of user data to be stored on the data storage server.

3. The method of claim 1, wherein the encryption key is further configured to decrypt the component of user data stored on the data storage server.

4. The method of claim 1, wherein authenticating the user comprises receiving authentication information for the user from a third-party authentication service.

5. The method of claim 1, wherein the encryption key is generated based on a passphrase provided by the user.

6. The method of claim 1, wherein the encryption key is generated using a symmetric-key algorithm.

7. The method of claim 1, wherein the encryption key is generated using an asymmetric key algorithm.

8. A system for providing an encryption key to a user, the system comprising:
   one or more processor devices; and
   a non-transitory machine-readable medium comprising instructions stored therein, which when executed by the one or more processors, cause the one or more processors to perform operations comprising:
   receiving, at an encryption key server, from a client machine, a request for an encryption key for a component of user data for a user, wherein the encryption key is one of a plurality of encryption keys for components of user data for the user,
   authenticating the user,
   determining, in response to the authenticating of the user, whether the encryption key for the component of user data is stored on the encryption key server,
   generating, if the encryption key for the component of user data is not stored on the encryption key server, the encryption key for the component of user data, wherein the encryption key is configured to be used with the component of user data and a data storage server which is different than the encryption key server, and
   transmitting the encryption key to the client machine;

wherein the encryption key server includes an authentication module for authenticating the user, a key generation module for generating the encryption key, a key storage module for storing the encryption key and an interface module for receiving the request for the encryption key from the client machine associated with the user.

9. The system of claim 8, wherein the encryption key is configured to encrypt the component of user data to be stored on the data storage server.

10. The system of claim 8, wherein the encryption key is configured to decrypt the component of user data stored on the data storage server.

11. The system of claim 8, wherein authenticating the user comprises receiving authentication information for the user from a third-party authentication service.

12. The system of claim 8, wherein the encryption key is generated based on a passphrase provided by the user.

13. A non-transitory machine-readable medium comprising instructions stored therein, which when executed by a machine, cause the machine to perform operations comprising:
receiving, at an encryption key server, from a client machine associated with a user, a request for an encryption key for the user, wherein the encryption key is configured to encrypt a component of user data to be stored on a data storage server or decrypt a component of user data obtained from the data storage server, and wherein the encryption key is one of a plurality of encryption keys for components of user data;
authenticating the user;
determining whether the encryption key is stored on the encryption key server; generating, if the encryption key for the component of user data is not stored on the encryption key server, the encryption key for the component of user data; and
transmitting the encryption key for the component of user data to the client machine;
wherein the encryption key server includes an authentication module for authenticating the user, a key generation module for generating the encryption key, a key storage module for storing the encryption key and an interface module for receiving the request for the encryption key from the client machine associated with the user.

14. The non-transitory machine-readable medium of claim 13, wherein the operations further comprise:
storing a copy of the generated encryption key on the encryption key server.

15. The non-transitory machine-readable medium of claim 13, wherein the operations further comprise:
authenticating the user based on at least one authentication credential associated with the user.

* * * * *